R. POOLE.
Fifth Wheel.
No. 25,164.
2 Sheets—Sheet 1.
Patented Aug. 16, 1859
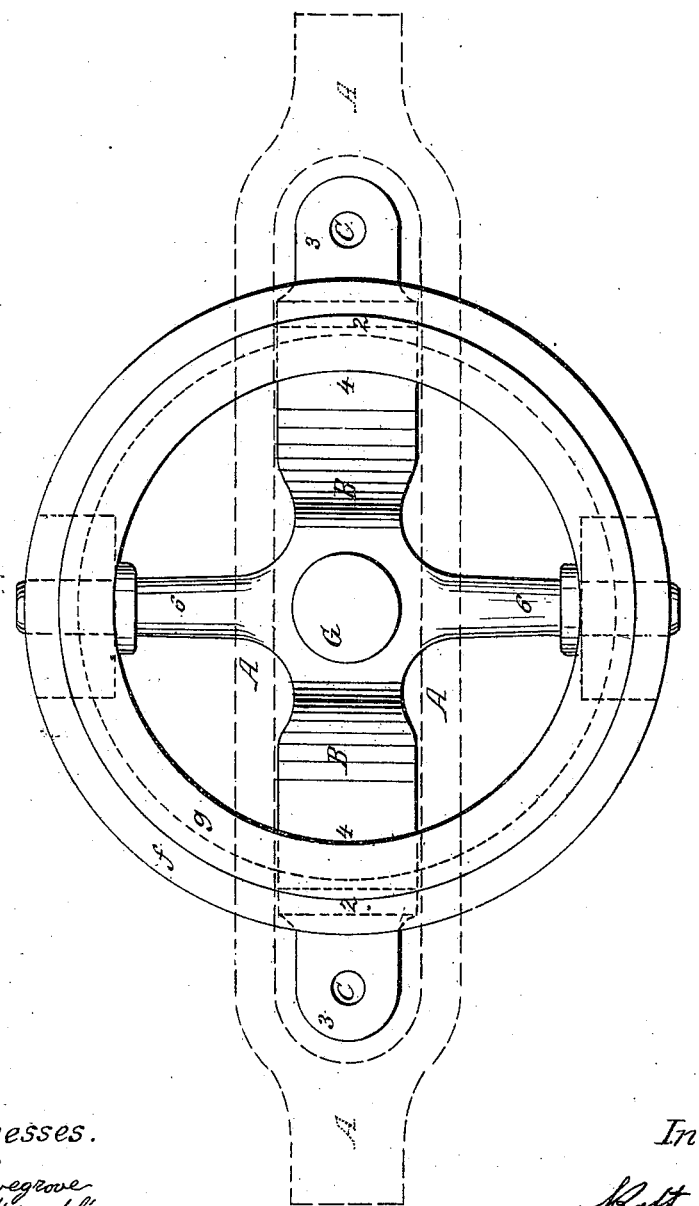
Witnesses.
J. T. Lovegrove
James Maughlin
Inventor.
Robt. Poole R. POOLE.
Fifth Wheel.
No. 25,164.
2 Sheets—Sheet 2.
Patented Aug. 16, 1859
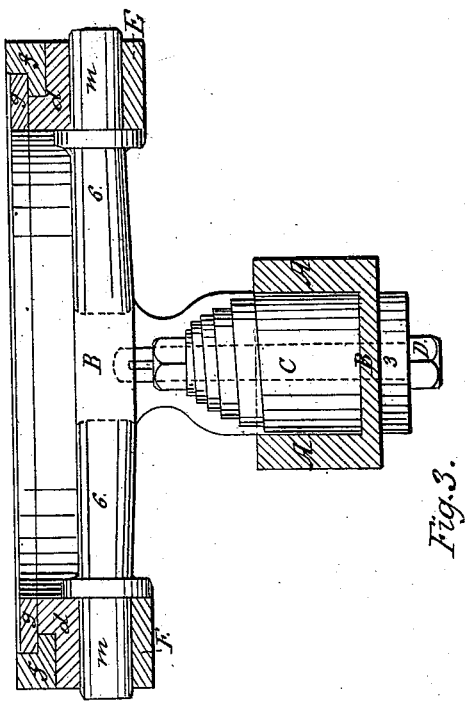
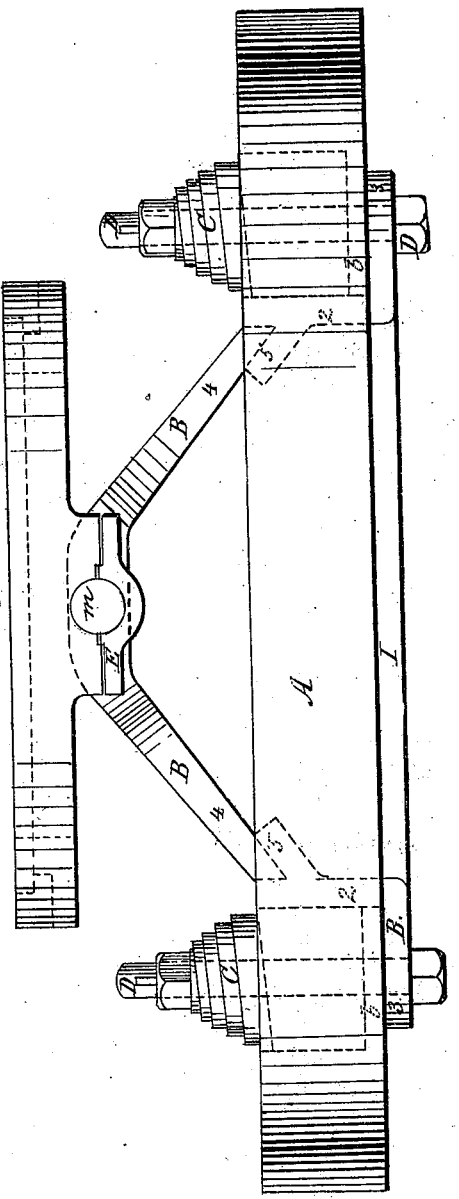
Witnesses.
Inventor.

UNITED STATES PATENT OFFICE.

ROBERT POOLE, OF BALTIMORE, MARYLAND, ASSIGNOR TO ROBT. POOLE AND GERMAN H. HUNT.

FIFTH-WHEEL OF FIRE-ENGINES AND OTHER VEHICLES.

Specification of Letters Patent No. 25,164, dated August 16, 1859.

*To all whom it may concern:*

Be it known that I, ROBERT POOLE, of Baltimore, State of Maryland, have invented certain new and useful Improvements in Fifth-Wheels of Steam Fire-Engines and other Heavy Vehicles; and I do hereby declare that the following is a full, clear, and exact description of the construction and operation of the same, reference being had to the accompanying drawings, in which—

Figure 1, represents a top view of said fifth wheel. Fig. 2, represents a vertical cross section through the same. Fig. 3, represents a side view of said fifth wheel, when secured to the axle of a vehicle.

The nature of my invention relates to the manner of suspending the frame or bolster, to which the fifth wheel is pivoted, to springs, and so that said bolster may play vertically in the open axle of the vehicle, and be guided in its motion therein, so as to insure a safe, simple and efficient connection between the axle and the carriage body.

To enable others skilled in the art to make and use my invention, I will proceed to describe its construction and operation.

A, represents a section of the axle of a heavy carriage, which is of the shape as represented in a top view in red lines in Fig. 1.

B, is a frame or bolster, which can play freely within the hollow part of the axle, and which is suspended to the spiral springs C, by means of the bolts D. The bolster B, is composed of two pieces. One consists in a longitudinal piece 1, which is formed at both its ends with flanges 2, and 3, the former passing through the hollow part of the axle, and serving as bearings therein, to guide the bolster in its vertical movement the latter fitting against the lower side of the axle, and preventing it from being pushed out by the action of the springs C, the parts 1, 2, and 3, are made in one piece   To this piece are fitted the arms 4, the lower ends of which rest in the recesses formed by the flanges 2 and 5, and which are secured to the latter by means of screws or otherwise. The conical spiral springs C, are fitted within suitable recesses of the axle and rest on the seats $b$, while the bolts D, by which the bolster is suspended to the springs C, pass through the holes in the seats $b$, and through the holes $c$, in the flanges 3. The upper part of the bolster consists of the arms 4, and the arms 6, which latter stand at right angles to the position of the former, and to which the fifth wheel is pivoted, so as to rock freely on the pivots or journals $m$, to which it is fitted by means of the journal boxes E.

The fifth wheel itself consists of a metal ring $d$; to this ring is fitted another metal ring $f$, in such a manner that it can turn freely on the stationary ring $d$, and the ring $f$, is connected to the carriage body in any efficient manner, and its cross section is of the shape represented in Fig. 2.

$g$, is a ring which is screwed down on the ring $d$, and which overlaps the flange of the ring $f$, so as to keep it in its place, and to prevent it from being removed from its bearings.

It is evident from the foregoing description that the fifth wheel, and consequently the carriage body will remain horizontal when the vehicle passes over uneven ground, as the fifth wheel can freely turn on the pivots or journals to which it is hung, and that any jars or concussions are balanced by the springs C to which the bolster, the fifth wheel and consequently the front end of the carriage body itself is suspended, while the bolster is retained in its proper position, by the axle on which it moves, and the entire apparatus being of such simple construction, as not to be liable to get out of order. But this improvement is not confined to the use of the conical spiral springs described, a spring of almost any known construction or material of the proper strength may be substituted with very slight modifications of the apparatus. Nor is it confined to allowing the bolster to play within the open axle, as the bolster itself may be open, and play over the axle, and attain the same practical result.

Having thus fully described the nature of my invention what I claim therein as new and desire to secure by Letters Patent is—

Hanging the pivoted fifth wheel of a steam fire engine or other heavy carriage to a bolster when the latter plays within or over the axle of a vehicle, and is suspended to springs which have their bearings or seats on said axle, substantially in the manner and for the purposes herein described.

ROBT. POOLE.

Witnesses:
T. I. LOVEGROVE,
JAMES MAUGHLIN.